United States Patent [19]
Giesler

[11] Patent Number: 5,413,309
[45] Date of Patent: May 9, 1995

[54] PUSH-TO-CONNECT COUPLER WITH INTERLOCKING THREE-WAY VALVE

[75] Inventor: Dennis C. Giesler, Maple Grove, Minn.

[73] Assignee: Parker-Hannifin Corporation, Cleveland, Ohio

[21] Appl. No.: 264,850

[22] Filed: Jun. 23, 1994

Related U.S. Application Data

[63] Continuation of Ser. No. 986,373, Dec. 7, 1992, abandoned.

[51] Int. Cl.6 ............................................. F16L 37/28
[52] U.S. Cl. ........................... 251/149.9; 137/614.06; 285/924
[58] Field of Search ............... 137/614.06, 614.04, 137/625.22; 251/149.9; 285/316, 924

[56] References Cited

U.S. PATENT DOCUMENTS

| | | | |
|---|---|---|---|
| 3,618,892 | 11/1971 | Sciuto, Jr. ......................... | 251/149.9 |
| 3,680,591 | 8/1972 | Vik ..................................... | 137/614.05 |
| 4,540,021 | 9/1985 | Rogers ............................... | 137/614.06 |
| 4,548,237 | 10/1985 | Bogenschultz .................... | 137/625.22 |
| 4,552,333 | 11/1985 | Niemi ................................ | 251/149.9 |
| 4,676,269 | 6/1987 | Sarson ............................... | 137/614.06 |
| 4,775,365 | 10/1988 | Swartz ............................... | 137/625.22 |
| 4,809,949 | 3/1989 | Rakieski ............................ | 251/310 |
| 5,074,332 | 12/1991 | Jones ................................. | 137/614.06 |
| 5,095,947 | 3/1992 | Weh et al. ......................... | 137/614.06 |
| 5,129,621 | 7/1992 | Maiville et al. ................... | 251/149.9 |
| 5,149,053 | 9/1992 | Galli .................................. | 251/149.9 |

FOREIGN PATENT DOCUMENTS

| | | |
|---|---|---|
| 0038768 | 10/1981 | European Pat. Off. |
| 0338942 | 10/1989 | European Pat. Off. |
| 1595266 | 6/1970 | France. |

OTHER PUBLICATIONS

Parker-Hannifin Corporation, Two Drawing Sheets Showing Prior Art Coupler and Mating Nipple.
Parker-Hannifin Corporation, One Drawing Sheet Showing Prior Art Three-Way Valve.
American Gas Association, Proposed American National Standard for National Gas Vehicle (NGV) Fueling Connection Devices (DRAFT) (1991 or Earlier).

*Primary Examiner*—A. Michael Chambers
*Attorney, Agent, or Firm*—Renner, Otto, Boisselle & Sklar

[57] ABSTRACT

A push-to-connect coupler including an interlocking three-way valve that enables coupling and uncoupling with respect to a mating nipple only when the coupler is in a vent mode. The coupler is characterized by a unique integration of a manually operated three-way ball valve that vents the coupler down to atmospheric or reduced pressure prior to coupling or uncoupling and preferably to a recovery line, a push-to-connect sleeve locking mechanism which interlocks with the manually operated handle of the three-way valve and whose operation is visibly obvious to the user, and an internal valve mechanism that prevents the free flow of media should the coupler become miscocked.

28 Claims, 4 Drawing Sheets

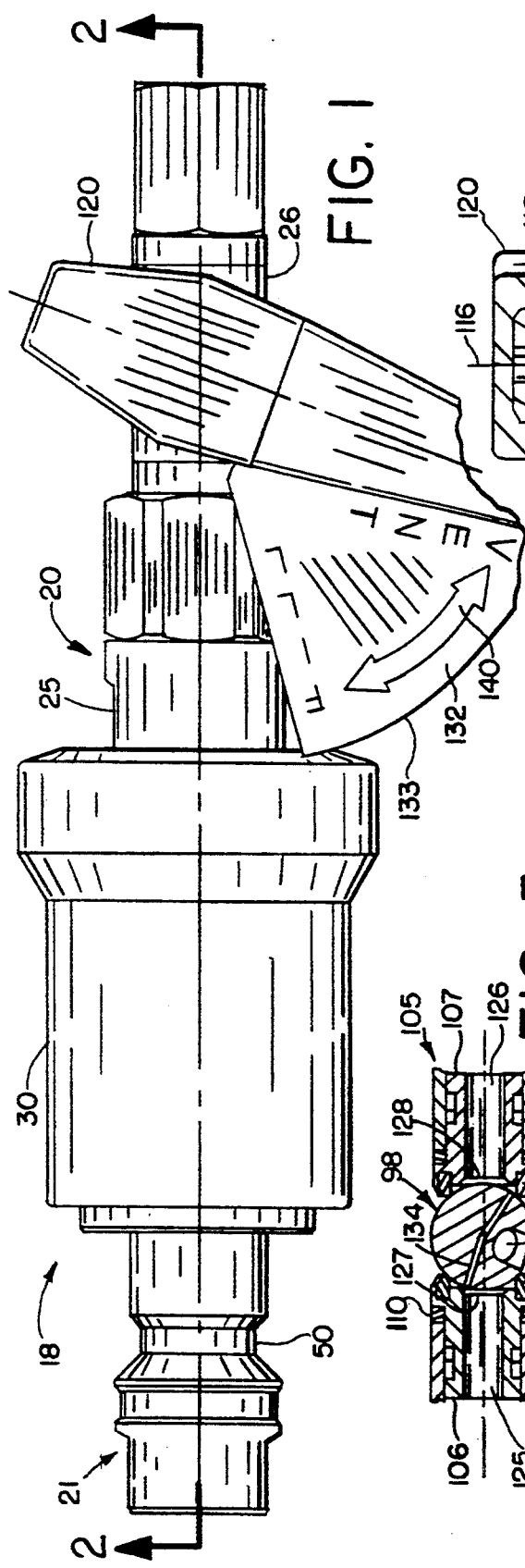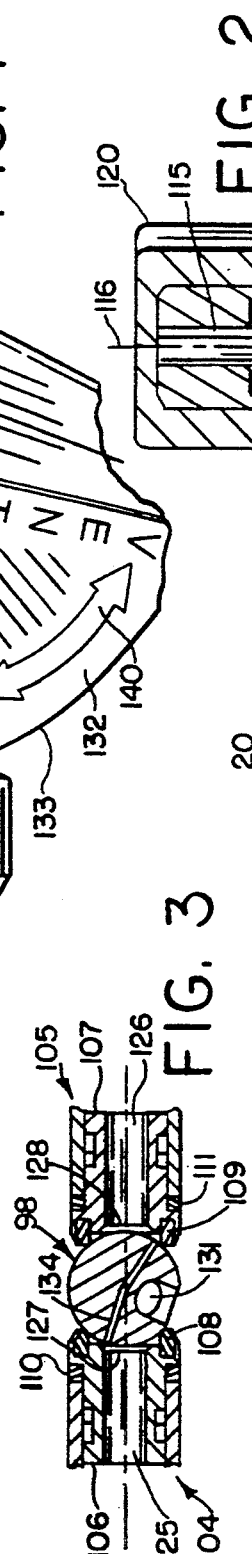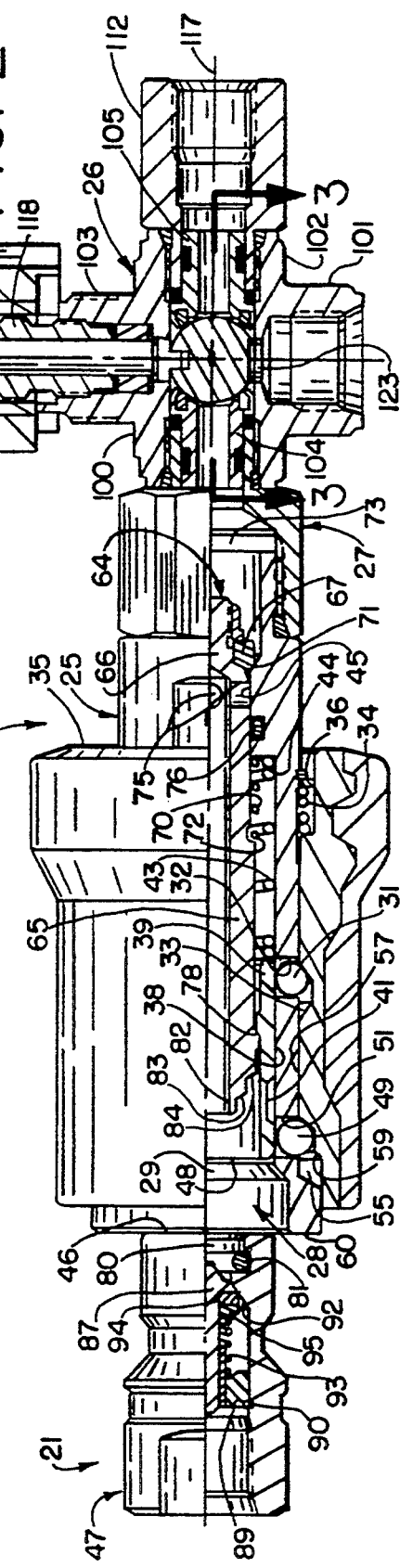

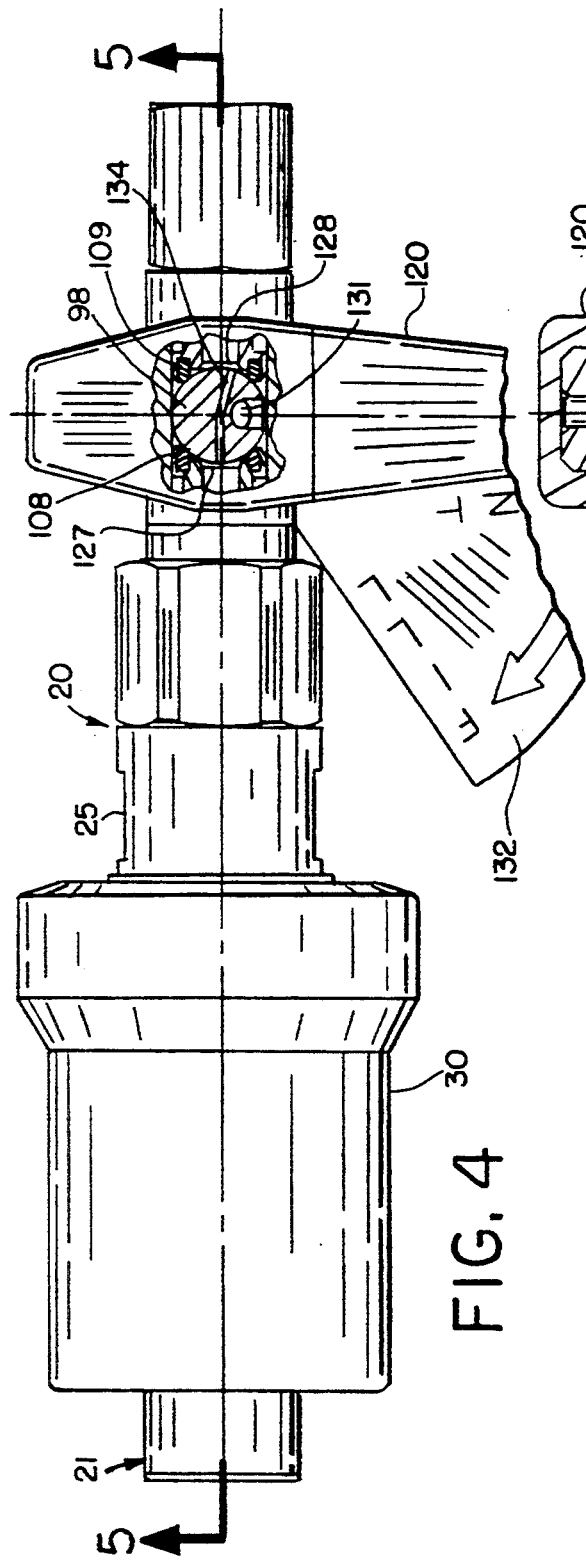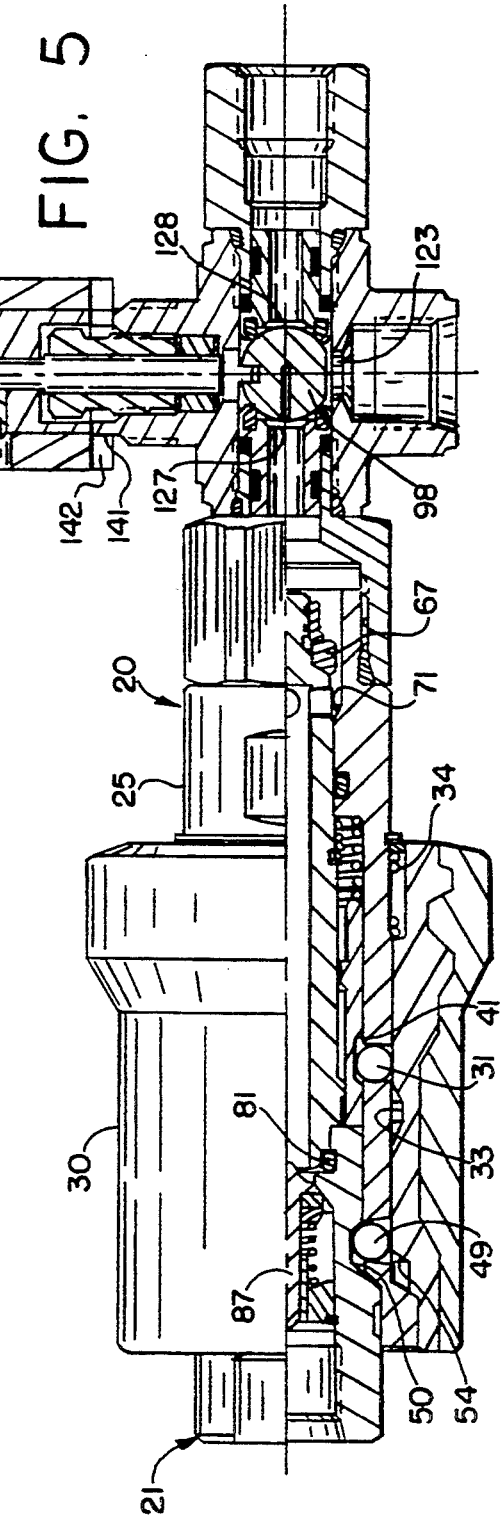

PUSH-TO-CONNECT COUPLER WITH INTERLOCKING THREE-WAY VALVE

This is a continuation of application Ser. No. 07/986,373, filed on Dec. 7, 1992, now abandoned.

The invention herein described relates generally to coupling devices for fluid systems and, more particularly, to valved couplings and specifically to a push-to-connect coupler with an interlocking three-way valve having a vent feature.

BACKGROUND

Quick-connect couplers heretofore have been used to interconnect with a mating nipple for transfer of a pressure fluid therebetween. Many of these quick-connect couplers have included valves for controlling fluid flow through the coupler. In some of these valved couplers, internal valve components are automatically operated by interconnection with the mating nozzle.

Various types of valves have been used with prior art couplers including flow control ball valves that are rotatable through 90° between fully open and closed positions. Also known are interlock devices that are intended to permit coupling or decoupling of the coupler and mating nozzle only when the valve is closed. Some prior art couplers are known to have provision for venting the coupler to atmospheric pressure prior to coupling and uncoupling.

A need exists for an improved coupler including an interlocking three-way valve that enables coupling and uncoupling with respect to a mating nipple only when the coupler is in a vent mode. Preferably, the coupler should be well suited for high pressure applications as a special need exists for a coupler useful in compressed natural gas (CNG) vehicle refueling systems wherein typical service pressures range from 2400 psig (16.5 MPa) to 3600 psig (24.8 MPa). In these systems, the coupler should operate in a manner that minimizes the potential for the escape of the highly pressurized natural gas as well as the potential for misuse. Also, the coupler and mating nipple preferably should be coupled and uncoupled at their front ends at atmospheric pressure even when the back ends of the coupler and/or nipple are under pressure, as would normally be the case in a CNG vehicle refueling system and other fluid pressure systems having a need for a quick-connect, valved fluid coupling with a vent feature.

SUMMARY OF THE INVENTION

The present invention provides an improved coupler that satisfies the aforesaid need for a coupler including an interlocking three-way valve that enables coupling and uncoupling with respect to a mating nipple only when the coupler is in a vent mode. The invention is also characterized by various novel coupler and valve subassemblies that have application in other types of couplers and/or valves, as will be appreciated by those skilled in the art. Overall, a preferred coupler according to the invention is characterized by a unique integration of various features including, inter alia, (1) a manually operated three-way ball valve that vents the coupler down to atmospheric or reduced pressure prior to coupling or uncoupling and preferably to a recovery line, (2) a push-to-connect sleeve locking mechanism which interlocks with the manually operated handle of the three-way valve and whose operation is visibly obvious to the user, and (3) an internal valve mechanism that prevents the free flow of media should the coupler become miscocked.

With the foregoing in mind, the invention provides a coupler comprising a housing including a coupler body portion and a valve body portion. The coupler body portion includes a socket for axially receiving a mating nipple, and the valve body portion has an inlet port, an outlet port and a vent port. A locking sleeve is mounted on the coupler body portion for axial movement between a lock position and a release position, and a nipple retainer mechanism is responsive to the axial position of the locking sleeve for holding the nipple in the socket when the locking sleeve is in its lock position and for permitting axial insertion or removal of the nipple when the locking sleeve is in its release position. The coupler further comprises a rotatable valve element mounted in the valve body portion between the inlet port, outlet port and vent port, and the valve element has a closed position for blocking flow of fluid from the inlet port to the outlet port and an open position for permitting flow of fluid through a passage therein from the inlet port to the outlet port. The valve element further includes a vent passage operable to effect fluid communication between the outlet port and the vent port when the valve element is in the closed position and not when in the open position. Also provided is a manually operable handle member movable between closed and open positions respectively for rotating the valve element between its closed and open positions. The handle member when in its open position is operative to interfere with the locking sleeve to prevent the locking sleeve from moving into its release position and when in its closed position to permit movement of the locking sleeve into its release position.

In a preferred embodiment, the locking sleeve when in its release position is operative to interfere with the handle member to prevent the handle member from being moved to its open position. The coupling also comprises a cocking member mounted within the coupler body portion for axial movement, and a sleeve retainer mechanism responsive to the axial position of the cocking member for holding the locking sleeve cocked in the release position through an initial range of movement of the cocking member and until the cocking member reaches an uncocking position allowing the locking sleeve to move from its release position to its lock position. The cocking member is positioned to be engaged by the nipple when inserted into the socket and movable thereby through the initial range of movement to the uncocking position. Preferably, the locking sleeve is biased toward its lock position, and the sleeve retainer mechanism includes a plurality of radially movable detents. A retaining surface on the cocking member holds the detents radially outwardly displaced through an initial range of movement of the cocking member and a relief at one end of the retaining surface permits radial inward displacement of the detents to release the locking sleeve for movement from its release position to its lock position.

Further in accordance with a preferred embodiment, the housing includes a connecting passage connecting the outlet port with the socket, and a stop valve is mounted for axial movement within the coupler body portion between open and closed positions respectively for opening and closing the connecting passage. The stop valve preferably is biased toward its closed position in a direction opposite the direction of insertion of the nipple into the socket, and the stop valve has an end thereof positioned to be engaged by the nipple when inserted into the socket for moving the stop valve from its closed to its open position.

Further in accordance with a preferred embodiment, the valve element is a ball valve having a rotation axis, and the ball valve is rotatable by 90° between full open and closed positions. The inlet port is disposed at an axial end of the ball valve, and the vent and outlet ports are opposed along a diameter perpendicular to the rotation axis. The outlet port and vent port are surrounded by respective annular seals that engage opposite sides of the valve ball to seal the outlet port and vent port from a valve region intermediate the annular seals.

According to another aspect of the invention, a valve for a pressurized fluid line comprises a valve body having an inlet port, an outlet port and a vent port, and a rotatable valve element mounted in the valve body between the inlet port, outlet port and vent port. The valve element has a closed position for blocking flow of fluid from the inlet port to the outlet port and an open position for permitting flow of fluid through a passage therein from the inlet port to the outlet port. The valve body further includes a vent passage operable to effect fluid communication between the outlet port and the vent port when the valve body is in the closed position and not when in the open position.

According to another aspect of the invention, a push-to-connect coupler comprises a coupler body including a socket for axially receiving a mating nipple, a nipple retainer mechanism radially movable in the coupler body for retaining a nipple in the socket, a coupler sleeve mounted on the coupler body for axial movement between a lock position radially inwardly displacing the nipple retainer mechanism to lock with the nipple and a release position permitting radial outward movement of the nipple retainer mechanism to release the nipple, a coupler sleeve retainer mechanism radially movable in the coupler body for retaining the coupler sleeve in its release position, and a cocking member mounted within the coupler body for axial movement. The cocking member is positioned to be engaged by the nipple when inserted into the socket and movable thereby through an initial range of movement radially outwardly displacing the coupler sleeve retainer mechanism to engage and hold the coupler sleeve in the release position to an uncocking position permitting radially inward movement of the coupler sleeve retainer mechanism to release the coupler sleeve for movement to its lock position thereby to lock the nipple in the coupler.

The foregoing and other features are hereinafter described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

FIG. 1 is a plan view of a coupling system with the coupler and mating nipple thereof disconnected.

FIG. 2 is a half elevational, half sectional view of the coupler and mating nipple taken from the line 2—2 of FIG. 1.

FIG. 3 is a partial sectional view showing a venting position of a ball valve employed in the coupler of FIG. 1, taken substantially along the line 3—3 of FIG. 2.

FIGS. 4 and 5 are views similar to FIGS. 1 and 2, respectively, but showing the nipple and coupler connected together and in a full vent mode.

DETAILED DESCRIPTION

Figure 6:
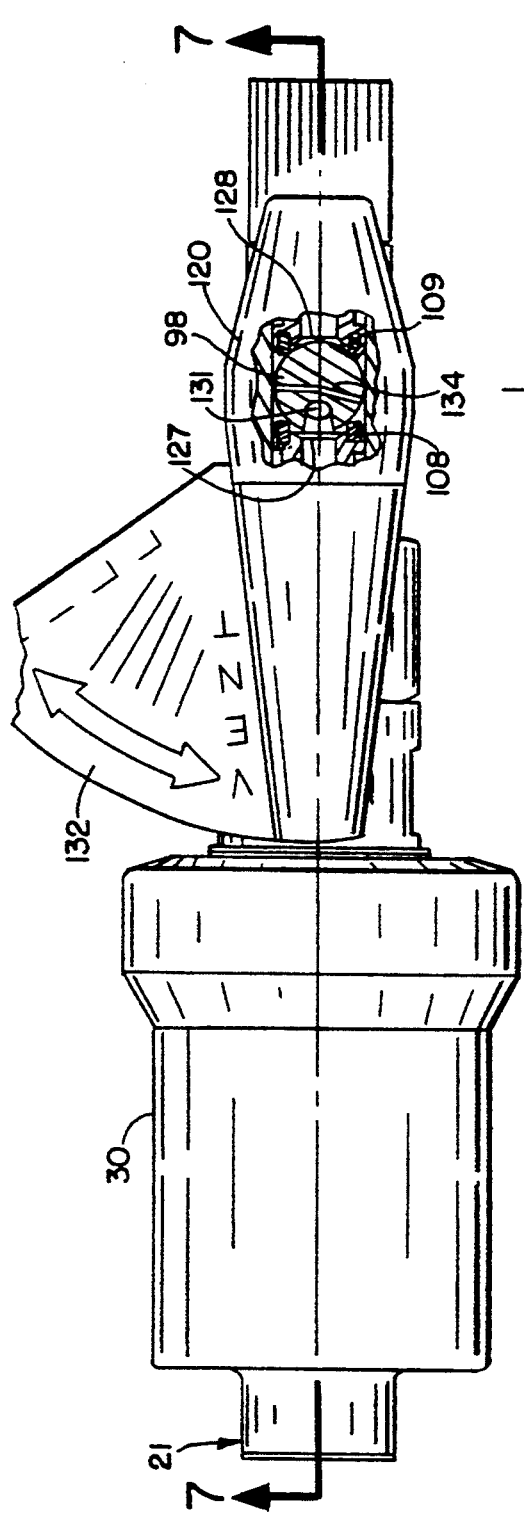
FIGS. 6 and 7 are views similar to FIGS. 4 and 5, respectively, but showing the connected coupler and nipple in a full open mode for transfer of pressurized media therethrough.

Referring now in detail to the drawings and initially to FIGS. 1 and 2, a preferred embodiment of the invention is illustrated by way of a coupling system indicated generally at 18. The coupling system 18 comprises a coupler 20, i.e. a female coupling, and a mating nipple 21, i.e., a male coupling. As the illustrated coupler 20 was conceived and developed for use in a CNG refueling system, it will be described chiefly in this context; however, those skilled in the art will readily appreciate that the inventive concepts embodied in the coupler 20 and the components thereof will be useful in applications other than CNG refueling systems. In general, the coupler 20 and mating nipple 21 are particularly suited for high pressure applications requiring quick coupling and uncoupling of the mating couplings at atmospheric pressure when one or both of the couplings are under pressure.

The coupler 20 includes a coupler housing 24 formed by an elongated tubular coupler body 25, a valve body 26 and an end connector 27 connected between the coupler body and valve body. The coupler body 25 has an axially extending through passage or bore 28. The forward end portion of the passage 28 is configured to form a socket 29 for receiving the nipple 21.

The coupler body 25 has a locking sleeve 30 slidably mounted thereon for telescoping axial movement. When the coupler 20 is uncoupled from the nipple 21 as shown in FIGS. 1 and 2, the locking sleeve 30 is held in a cocked uncoupled or release position by at least one and preferably a plurality of radially outwardly displaced detents 31. In the illustrated embodiment there are three circumferentially equally spaced apart detents in the form of balls that are located in respective apertures 32 in the coupler body 25 for radial movement.

The radially outwardly displaced detents 31 engage in an annular cocking groove 33 formed in the inner diameter surface of the locking sleeve 30. The detents 31 axially interfere with the rearward side or stop surface of the cocking groove 33 to prevent the locking sleeve 30 from being shifted forwardly (to the left in FIGS. 1 and 2) by the biasing action of a coil spring 34. The sleeve spring 34 is telescoped over the coupler body 25 and is housed within a counterbore in the rear face 35 of the locking sleeve. The sleeve spring 34 is trapped between the bottom of the counterbore in the locking sleeve and a retaining ring 36 on the coupler body 25 for resiliently urging the locking sleeve forwardly along the coupler body.

The locking sleeve retainer detents 31 are each engaged and held in their radially outwardly displaced position by a cylindrical retaining surface 38 at the outer diameter of a cocking member 39. The cocking member 39 in the illustrated embodiment is in the form of an internal ring mounted for telescoping sliding movement within the socket 29. The cocking member or ring 39 is positioned within the socket so that it will be engaged and shifted axially rearwardly by the nipple 21 when the nipple is axially inserted into the socket 29. The retaining surface 38 extends along a portion of the axial length of the cocking ring and forwardly to a radial relief formed by an annular uncocking groove 41 in the cocking ring. The cocking ring is biased forwardly (to the left in FIG. 2) by a coil spring 43 interposed between the rear end of the cocking ring and an internal shoulder 44 formed at the intersection of the socket 29 with a relatively smaller diameter valve guide bore 45 forming an intermediate portion of the passage 28 extending axially through the coupler body 25.

When the nipple 21 is axially inserted into the socket 29, the front face 46 of the body 47 of the nipple 21 will engage the front face 48 of the cocking ring 39 and push the cocking ring rearwardly. During an initial range of movement of the cocking ring the retaining surface 38 thereof will hold the locking sleeve retainer detents 31 radially outwardly displaced and engaged in the cocking groove 33 of the locking sleeve 30 thereby holding the locking sleeve in its cocked position as shown in FIG. 2. When the cocking ring has been shifted sufficiently to bring the uncocking groove 41 into radial alignment with the detents 31, the detents 31 will then be free to move radially inwardly and out of the cocking groove 33 in the locking sleeve. This will allow the locking sleeve 30 to move forwardly with the assistance of the locking sleeve spring 34. The rearward sloped surface of the cocking groove 33 will cam the detents radially inwardly into the uncocking groove 41 in the cocking ring and out of the cocking groove, so that the locking sleeve may be moved forwardly from its cocked uncoupled or release position in FIGS. 1 and 2 to its uncocked coupled or lock position in FIGS. 4 and 5.

As the locking sleeve 30 moves forwardly from its cocked position to its uncocked position shown in FIGS. 4 and 5, it will cause at least one and preferably a plurality of nipple locking detents 49 to be radially inwardly displaced into an annular locking groove 50 of the nipple 21. In the illustrated embodiment there are eight circumferentially equally spaced apart detents 49 in the form of balls that are located in respective apertures 51 in the coupler body 25 for radial movement between radially outwardly and inwardly displaced positions shown in FIGS. 2 and 5, respectively.

When the nipple 21 has been inserted into the coupler socket 29 a sufficient distance to effect release of the locking sleeve 30 in the above described manner, the nipple's locking groove 50 will be aligned radially with the nipple locking detents 49. This allows the nipple locking detents 49 to be forced radially inwardly by a sloped camming shoulder 54 formed at the bottom of a forwardly opening counterbore 55 in the locking sleeve 30. After the nipple locking detents 49 have been radially inwardly displaced into the nipple's locking groove 50, a ball retainer surface 57 at the inner diameter of the locking sleeve 30 moves over the nipple locking detents as the locking sleeve moves into its uncocked coupling position shown in FIGS. 4 and 5. The ball retaining surface 57 holds the nipple locking balls in their radially inwardly displaced position to prevent their disengaging from the nipple's locking groove 50, thereby to securely lock the nipple 21 to the coupler 20.

The counterbore 55 at the forward end of the locking sleeve 30 is stepped to form a stop surface 59 axially forwardly of the shoulder surface 54. The stop surface 59 engages a radially outwardly protruding stop flange 60 at the forward end of the coupler body 25 to limit forward movement of the locking sleeve and thereby define the uncooked coupled position of the locking sleeve.

The nipple 21 may be uncoupled from the coupler 20 by manually shifting the locking sleeve 30 rearwardly to its cocked position. As the locking sleeve moves out of its uncocked coupling position shown in FIGS. 4 and 5, the detent retaining surface 57 at the inner diameter of the locking sleeve will move out of engagement with the nipple locking detents 49 thereby freeing the balls for radially outward displacement into a radial relief formed by the inner region of the counterbore 55. At the same time, the cocking groove 33 in the locking sleeve 30 will be aligned radially with the locking sleeve retainer detents 31. The retainer detents 31 may then move radially outwardly to release the cocking ring 39 which will be urged forwardly by the cocking ring spring 43. In turn, the nozzle 21 will be urged out of the socket 29 by this spring action while the nipple locking detents 49 are cammed out of the nipple locking groove 50. As the cocking ring is shifted forwardly from its position shown in FIG. 5, the retaining surface 38 will once again engage and hold the locking sleeve retainer detents 31 radially outwardly displaced and engaged in the cocking groove 33 of the locking sleeve 30, thereby holding the locking sleeve in its cocked position as shown in FIG. 2.

Further in accordance with the invention, the coupler 20 includes an internal stop valve 64. The stop valve has a tubular stem portion 65 and a reduced diameter head portion 66 which closes the rearward end of the tubular stem 65. The tubular stem is supported for axial movement in the guide bore 45 in the coupler body.

The head portion 66 has secured thereto a radially enlarged annular seal 67 by a nut 68 threaded onto the head portion. The seal 67 is normally held closed by a valve spring 70 against an annular valve seat 71 formed by a sloped shoulder at the intersection of the guide bore 45 and a rear end portion 73 of the passage 28 in the coupler body 25. The valve spring 71 is interposed between the shoulder 44 and a shoulder 72 on the valve stem 65 for resiliently urging the valve body in a forward direction to maintain the valve seal 67 in sealing engagement with the annular valve seat 70 thereby blocking flow of any pressurized media through the coupler body 25.

When the nipple 21 is inserted into the socket 29 of the coupler 20, the nipple contacts the forward end of the stop valve 64 and pushes the stop valve stem rearwardly to move the valve seal 67 off of the valve seat 71. Also, radial openings 75 in the wall of the stem 65 just forwardly of the valve seal 67 will be shifted to the rear of the valve seat 71 to provide for relatively unrestricted fluid flow through the coupler body 25. That is, the radial openings 75 establish a relatively large area flow path for fluid flowing from the rear end portion 73 of the coupler passage 28 to the interior of the valve stem 65 for passage into the nipple 21. An annular seal 76 is provided to seal between the valve stem and the coupler body to prevent leakage of fluid from the just described flow path through the coupler body. The valve stem 65 has an annular external shoulder for engaging an annular internal shoulder on the cocking ring 39 as seen at 78 in FIG. 2 to provide a forward stop for the cocking ring.

The forward end of the valve stem 65 is configured for mating engagement in a socket 80 formed in the forward end of the body 47 of the nipple 21. The socket 80 has retained therein an annular interface seal 81 for sealing against leakage between the nipple body and the valve stem 65. As shown in FIG. 2, the forward end of the valve stem is stepped to form a short axially extending tubular portion 82 which telescopes into the annular interface seal 81 as seen in FIG. 4 and which is surrounded by an annular shoulder 83 that also engages the annular seal but at the forward side surface thereof. The stem also has a further radially outward annular shoulder 84 which forms an abutment that is engaged by the front face 46 of the nipple 21 when inserted into the socket 29 in the coupler body 25.

The nipple 21 also includes an internal check valve 87. The check valve 87 has a valve stem guided for axial movement in a spider retainer 89 located within the interior passage of the nipple 21 by a retainer ring 90. The valve stem terminates at a radially enlarged head 20 that is normally urged against a valve seat 92 by a coil spring 93. The spring 93 also acts upon an annular valve seal 94 through a follower 95 to hold the valve seal to the back side of the valve head. The valve seal 94 extends radially beyond the valve head to also engage against the valve seat 92 to prevent flow through the nipple 21. Accordingly, the nipple 21 may be attached to the end of a pressurized conduit, the check valve operating to prevent fluid from escaping through the nipple. By way of specific example, the nipple 21 may be coupled to the fill line of a vehicle through which compressed natural gas may be supplied via the coupler 20 to fill a storage tank contained in the vehicle.

When the nipple 21 is coupled to the coupler 20, the check valve 87 will be held closed by the check valve spring 93 and also by fluid pressure in the conduit to which the nipple 21 is attached. However, when high pressure media is flowed through the coupler 20 to the nozzle, the nozzle check valve will open once the pressure in the coupler exceeds the pressure behind the nipple's check valve, thereby to allow flow to occur. The flow of pressurized media through the coupler is controlled by a valve element in the form of a ball valve 98 mounted in the valve body 26.

The valve body 26 is joined with the coupler body 25 by the end connector 24. The end connector 24 is internally threaded at one end for threaded attachment to the externally threaded rear end portion of the coupler body 25 and it is externally threaded at its opposite end for threaded receipt in an internally threaded passage in one leg 100 of the valve body. The valve body has the shape of a cross and, accordingly, has three other legs 101–103 in addition to the leg 100 to which the coupler body is attached. The four legs 100–103 are disposed in a common plane at right angles with respect to one another.

The legs 100–103 have passages extending therethrough and intersecting at the center of the valve body where the ball valve 98 is located. The ball valve is retained between a pair of ball valve seal assemblies 104 and 105 on opposite sides thereof. As best shown in FIG. 3 each ball valve seal 104, 105 includes a retainer ring 106, 107 having at its inner end an annular seal 108, 109 that engages the ball valve to prevent leakage between the ball valve and the retainer ring. The seal assemblies 104 and 105 are preferably spring loaded against the sides of the ball valve by wave springs 110 and 111. In the illustrated embodiment, the ball valve seal assembly 104 in the valve body leg 100 is retained in the passage thereof by the externally threaded end of the end connector 24. Similarly, the ball valve seal assembly 105 in the opposite leg 102 is retained by the externally threaded portion of another end connector 112 which is threaded into the passage in the leg 102.

At the upper end of the ball valve 98 as illustrated in FIG. 1, there is provided a slot for receiving a key at the end of a handle stem 115 whereby the ball valve may be rotated through 90° about an axis 116 extending perpendicular to the common axis 117 of the ball valve seat assemblies. The rotation axis 116 also is aligned with the lower and upper legs 101 and 103 of the valve body 26. The stem 115 is supported for rotation about its axis in a packing nut 118 threaded into the upper leg 103 of the valve body. The stem projects upwardly beyond the packing nut and has keyed thereto a handle 120. Suitable packing and a retainer therefore may be interposed between the packing nut and the bottom of the passage in the upper leg 103 to seal against the escape of pressurized fluid through the passage in the upper leg, as is conventional. The handle 120 may be rotated through 90° to similarly rotate the ball valve 98 between open and closed positions.

The lower leg 101 of the valve body 26 has an interior passage which opens at a port 123 to the bottom of the ball valve 98 between the ball valve seals 108 and 109. The port 123 is herein referred to as the inlet port as it is normally intended to be connected to a supply of pressurized media to be dispensed through the coupling 20 to the nipple 21. The passage in the lower leg 101 may be internally threaded or otherwise suitable configured for receipt of an end connector or other fitting as desired to effect connection to a supply of pressurized fluid such as a storage tank for compressed natural gas.

The ball valve seal assemblies 104 and 105 have through passages 125 and 126 which open to opposite sides of the ball valve at ports 127 and 128, respectively. The port 127 is herein referred to as the outlet port as pressurized fluid would normally be dispensed through this port to the nipple 21 via the coupler body 25. The other port 128 is herein referred to as the vent port as its function in the illustrated preferred embodiment is to vent pressurized fluid that is trapped in the coupler body 25 when the ball valve 98 is closed. The outlet and vent ports 127 and 128 are surrounded by the ball valve seals 108 and 109, respectively, and are thereby separated from the region between the ball seats that is in communication with the inlet port 123. The vent port 128 may communicate with the atmosphere directly or via a muffler, filter, etc., as may be desired. Alternatively, the vent port may be coupled to a reclamation or recycling system for reclaiming or recycling pressurized media vented through the vent port, as is particularly desirable in a CNG refueling system. Preferably, the compressed natural gas is reclaimed to prevent product loss and further to protect against any adverse environmental impact that venting of the compressed natural gas to the atmosphere may have.

The ball valve 98 has a valve passage 13 1 for permitting flow from the inlet port 123 to the outlet port 127 when the ball valve is in its open position. The valve passage 131 has an inlet at the bottom of the ball valve which is concentric with the inlet port 123 and consequently the rotational axis 116 of the ball valve. At its other or outlet end, the valve passage opens to a side of the ball valve for rotation into and out of communication with the outlet port 127 when the handle 120 is rotated 90° between open and closed positions.

As seen in FIG. 1, the handle 120 has an ear portion 132 that has an arcuate abutment surface 133 concentric with the rotation axis 116 of the ball valve 98. When the locking sleeve 30 is in its cocked position as shown in FIG. 1, the front face 35 of the locking sleeve will interfere with the abutment surface 133 to prevent rotation of the handle 120 beyond its position illustrated in FIG. 1. This will prevent the ball valve 98 from being rotated beyond its position shown in FIG. 3 where the ball valve has not been rotated sufficiently to establish communication between the inlet port 123 and the outlet port 127. Accordingly, the ball valve cannot be rotated into its open position so long as the locking sleeve 30 remains in its cocked position shown in FIG. 1.

The ball valve 98 also has a vent passage 134 extending generally between diametrically opposed sides of the ball valve generally in a plane perpendicular to the rotation axis 116 of the ball valve. The vent passage 134 is operable to effect fluid communication between the outlet port 127 and the vent port 128 when and only when the ball valve is in its closed position. More particularly, the opposite ends of the vent passage are positioned so as to communicate respectively with the outlet port and vent port only when the ball valve is in its closed position. When the ball valve is in its open position, the vent passage 134 is rotated out of fluid communication with the vent port 128.

The operation of the coupler 20 will now be described with initial reference to FIGS. 1–3. The coupler is there shown ready to be coupled with the nipple 21 as by pushing the coupler 20 onto the nipple. Accordingly, the locking sleeve 30 is in its cocked release position which, as above mentioned, limits rotation of the handle 120 to a point short of the ball valve being opened, thereby protecting against the ball valve being opened when the coupler 20 is not connected to the nipple 21. Also, the coupler will be in a vent mode with the vent passage 134 in the ball valve providing communication between the outlet port 127 and the vent port 128 at any position of the ball valve between its position shown in FIGS. 1–3 and its full closed position shown in FIGS. 4 and 5. That is, the coupler will remain in its vent mode between its full closed position and its position shown in FIGS. 1–3 where the handle has been rotated to its point of interference with the locking sleeve.

With the coupler 20 in its vent mode, the coupler may be connected with the mating nipple 21. To make a connection, the nipple is inserted into the coupler's socket 29, moving the cocking ring 39 rearwardly to the point that allows the locking sleeve retainer detents 31 to move into the release groove 41 in the cocking ring. This allows the locking sleeve 30 to move forward with the assistance of the locking sleeve's spring 34. This action forces the nipple locking detents 49 radially inwardly into the nipple's locking groove 50 thereby locking the nipple to the coupler.

Also during insertion of the nipple 21 into the socket 29, the stop valve 64 in the coupler 20 will be engaged by the nipple and shifted rearwardly thereby moving the annular valve 67 off of the valve seat 71. The forward end of the stem 65 of the stop valve 64 will also be sealingly engaged in the nipple socket 80.

Coupling of the coupler 20 with the nipple 21 will be accomplished without actuating the check valve 87 in the nipple. The check valve 87 may remain pressurized and held in its position shown in FIG. 2 to prevent the escape of any pressurized media from behind the check valve.

In FIGS. 4 and 5, the coupler 20 and nipple 21 are shown coupled together and ready for transfer of pressurized media from the coupler to the nipple. FIGS. 4 and 5 also show the handle 120 in its full closed and vent position. The handle extends perpendicular to the longitudinal axis of the coupler 120 to provide a visual indication of the closed position of the coupler ball valve 98. Also, the ear of the handle may be marked with "VENT" and "FILL" and a direction indicating arrow 140 to facilitate operation of the coupler. Counterclockwise rotation of the handle beyond its full closed position illustrated in FIG. 4 is precluded by a stop indicated at 141 in FIG. 5 which engages an abutment surface 142. A similar stop and abutment surface are provided to prevent clockwise rotation of the handle beyond its full open position shown in FIG. 6. Accordingly, rotation of the handle is limited to rotation through 90° between full closed and full open positions respectively shown in FIGS. 4 and 6.

Figure 7:
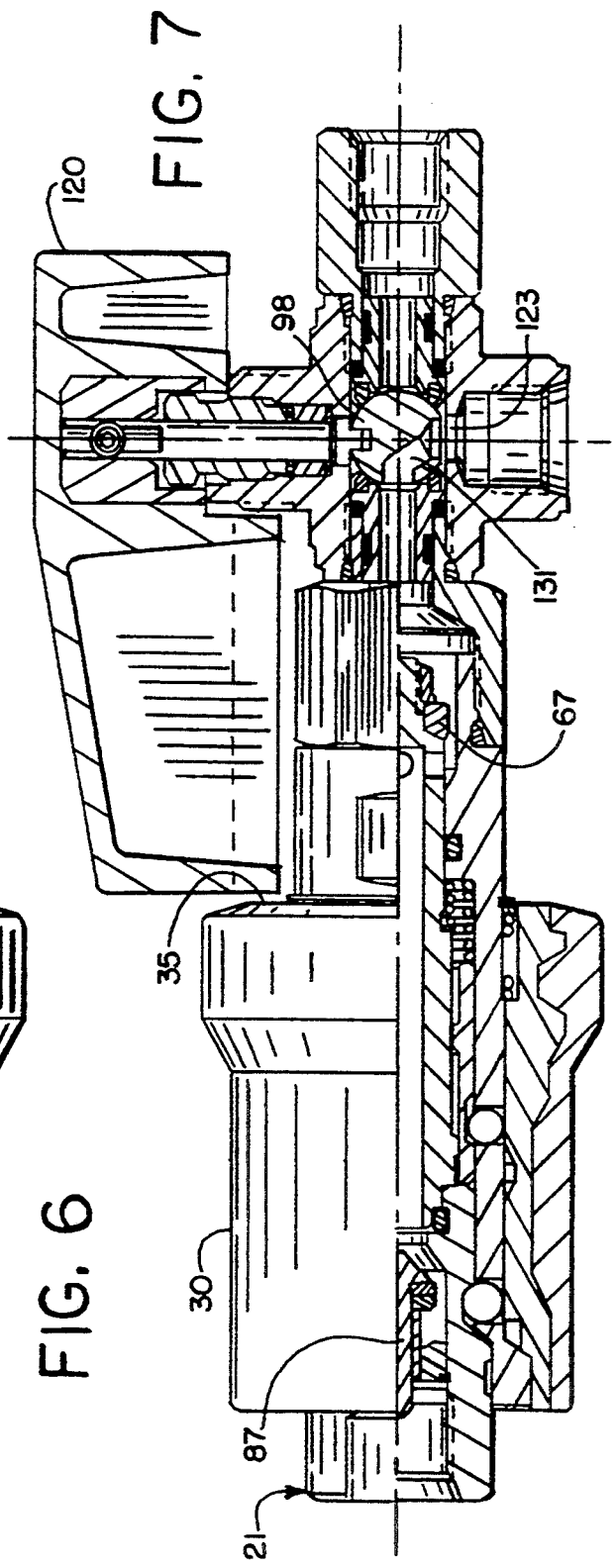

As indicated, the handle 120 can be turned clockwise from its full closed position to its full open position shown in FIGS. 6 and 7. In this position the handle extends parallel to the longitudinal axis of the coupler body 25. As the handle is rotated from its full closed position to its full open position, the ball valve 98 will be turned to establish communication between the inlet port 123 and the outlet port 127 via the generally L-shaped passage 131 in the ball valve 98. Before the outlet end of the valve passage 131 moves into communication with the outlet port 127, the vent end of the vent passage 134 will move out of communication with the vent port 128.

Upon opening of the valve ball, pressurized media may flow from the inlet port 123 to the outlet port 127 and then through the interior passage 28 of the coupler body 25, as the stop valve 64 will then be held off the valve seat 71 as above indicated. Once the pressure in the flow passage through the coupler 25 exceeds the pressure behind the nipple's check valve 87, the nipple's check valve will open and flow will occur from the coupler to the nipple. In the on or flow position, the handle 120 will function as an obstruction preventing rearward movement of the locking sleeve 30. This will prevent uncoupling of the nipple from the coupler. During media transfer, the nipple's interface seal 81 contacts the stem 65 of the stop valve 64 to prevent media from escaping into the atmosphere.

Should the pressure acting on opposite sides of the nipple's check valve 87 become balanced, the check valve will close and prevent any further flow. This will occur when the handle 120 is rotated to shut off the supply of pressurized media and vent the coupler. As the handle is rotated from its full open position to its full closed position, the outlet end of the passage 13 1 in the ball valve 98 will move out of communication with the outlet port 127 and then further rotation of the ball valve will rotate opposite ends of the vent passage 134 into fluid communication with the outlet and vent ports 127 and 126, thereby venting the coupler 20. Also, the handle will have been rotated out of its position blocking rearward movement of the locking sleeve 30 thereby allowing the coupler to be disconnected from the nipple.

Figure 8:
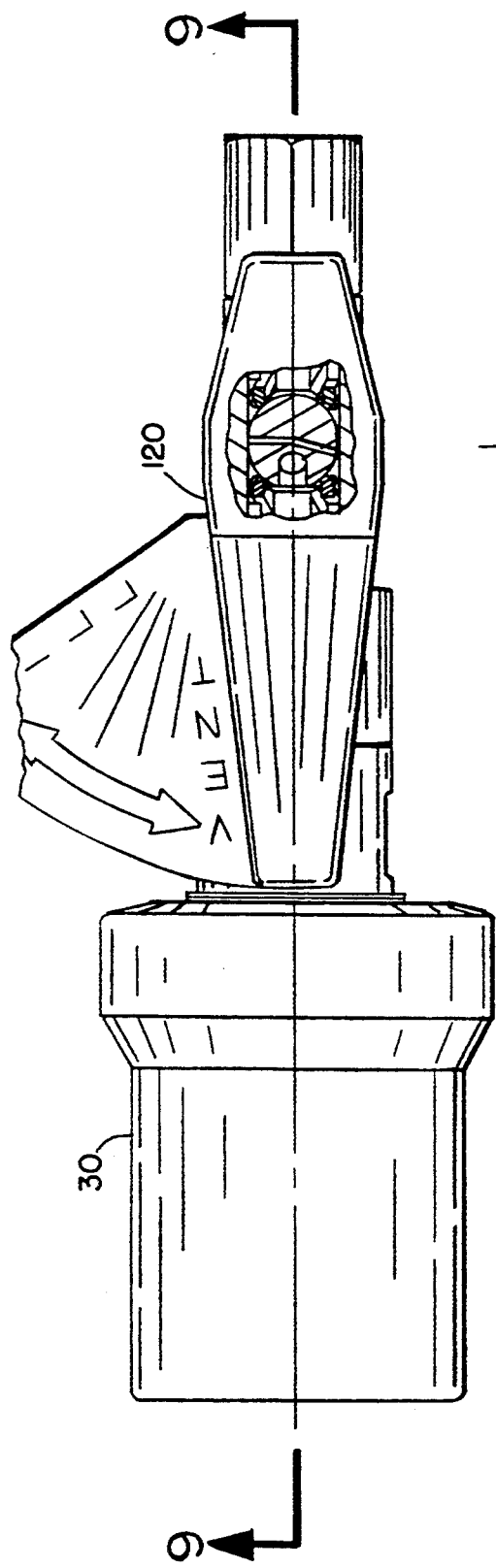
FIGS. 8 and 9 are views similar to FIGS. 1 and 2, respectively, showing the coupler in a miscocked condition.
Figure 9:
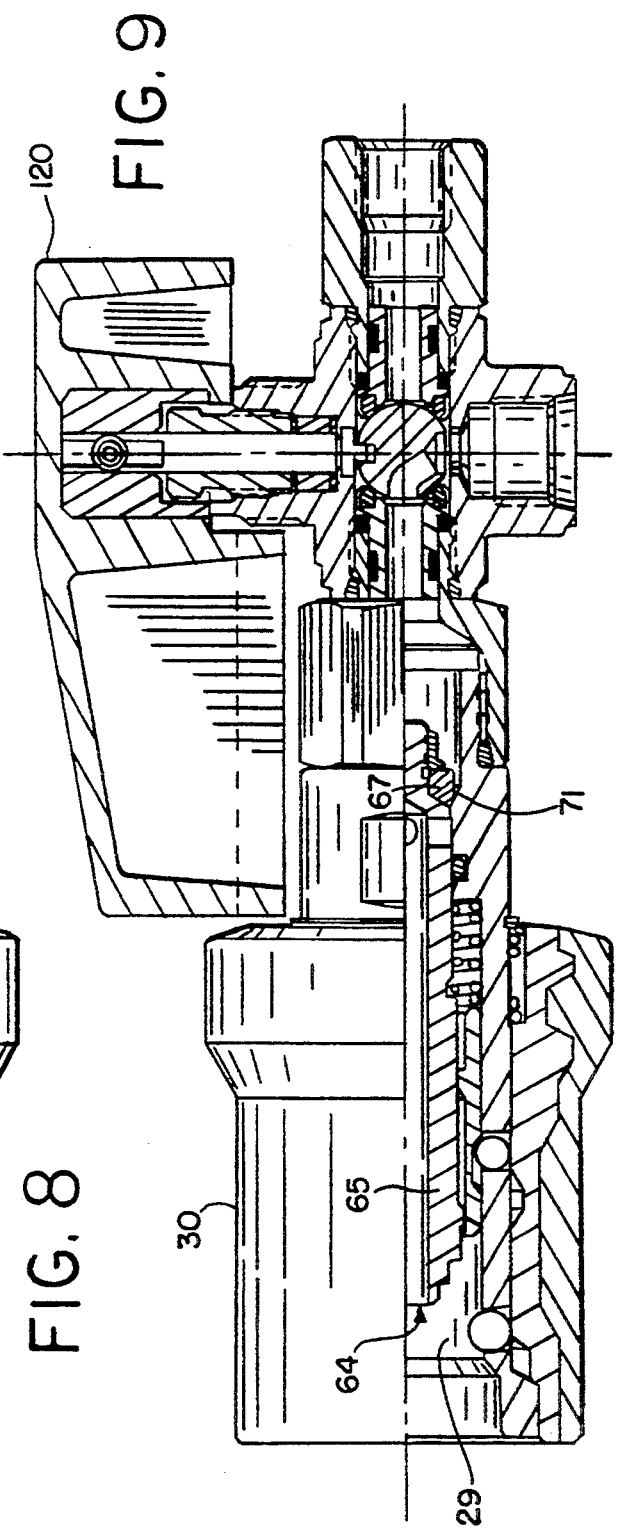

Referring now to FIGS. 8 and 9, a further feature of the coupler 21 is illustrated. Should the coupler 21 somehow become miscocked (false connected) to allow the locking sleeve 30 to move to its coupled position without the coupler being connected to a mating nipple, the stop valve spring 72 will function to hold the stop valve closed against the valve seat 71. Even if the ball valve 98 is turned on by rotation of the handle 120 to its position illustrated in FIGS. 8 and 9, the stop valve will prevent the flow of pressurized media through the coupler.

Summarizing, the interlocking features of the coupler require the user to couple and uncouple the coupler to a mating nipple with the coupler in its vent mode. The coupler will not allow pressurized media to flow therethrough unless coupled to a mating nipple. Once the coupler is connected to the mating nipple and the supply is turned on, the user cannot uncouple the nipple from the coupler without first placing the coupler in its vent mode. Even in the unlikely event that the coupler is miscocked and the valve is turned on, internal valving within the coupler prevents any flow of pressurized media. Accordingly, the aforedescribed coupler minimizes the potential for misuse.

Although the invention has been shown and described with respect to a preferred embodiment, equivalent alterations and modifications will of course occur to others skilled in the art upon the reading and understanding of this specification. The present invention includes all such equivalent alterations and modifications, and is limited only by the scope of the following claims.

What is claimed is:

1. A coupler comprising
    a housing including a coupler body portion and a valve body portion, said coupler body portion including a socket for axially receiving a mating nipple, and said valve body portion having an inlet port, an outlet port and a vent port;
    a locking sleeve mounted on said coupler body portion for axial movement between a lock position and a release position,
    nipple retainer means responsive to the axial position of said locking sleeve for holding the nipple in said socket when said locking sleeve is in its lock position and for permitting axial insertion or removal of the nipple when said locking sleeve is in its release position;
    a rotatable valve element mounted in said valve body portion between said inlet port, outlet port and vent port, said valve element having a closed position for blocking flow of fluid from said inlet port to said outlet port and an open position for permitting flow of fluid through a flow passage therein from said inlet port to said outlet port, and valve element further including a vent passage operable to effect fluid communication between said outlet port and said vent port when said valve element is in said closed position and not when in said open position; and
    a manually operable handle member movable between closed and open positions respectively for rotating said valve element between its closed and open positions, said handle member when in its open position being operative to interfere with said locking sleeve to prevent said locking sleeve from moving into its release position and when in its closed position to permit movement of said locking sleeve into its release position.

2. A coupler as set forth in claim 1, wherein said locking sleeve when in its release position is operative to interfere with said handle member to prevent said handle member from being moved to its open position.

3. A coupler as set forth in claim 2, comprising a cocking member mounted within said coupler body portion for axial movement, and sleeve retainer means responsive to the axial position of said cocking member for holding said locking sleeve cocked in said release position through an initial range of movement of said cocking member and until said cocking member reaches an uncocking position allowing said locking sleeve to move from its release position to its lock position, said cocking member being positioned to be engaged by the nipple when inserted into said socket and movable thereby through said initial range of movement to said uncocking position.

4. A coupler as set forth in claim 3, comprising bias means for urging said locking sleeve from its release position to its lock position.

5. A coupler as set forth in claim 3, wherein said retainer means includes a plurality of radially movable detents, and said cocking member includes retaining surface means for holding said detents radially outwardly displaced through said initial range of movement of said cocking member and relief means at one end of said retaining surface means for permitting radial inward displacement of said detents to release said locking sleeve for movement from its release position to its lock position.

6. A coupler as set forth in claim 3, wherein said housing includes a connecting passage connecting said outlet port with said socket; and comprising valve means mounted for axial movement within said coupler body portion between open and closed positions respectively opening and closing said connecting passage, and bias means for urging said valve means from its open position to its closed position in a direction opposite the direction of insertion of the nipple into said socket; and said valve means having an end thereof positioned to be engaged by the nipple when inserted into said socket for moving said valve means from its closed to its open position.

7. A coupler as set forth in claim 6, wherein said cocking member is a cocking ring mounted for telescoping movement within said socket, and said valve means includes a tubular stem mounted for telescoping movement within said cocking ring, and said stem has a shoulder for engaging a shoulder on said cocking ring to provide a stop for said cocking ring.

8. A coupler as set forth in claim 1, wherein said valve element is a ball valve having a rotation axis, and said ball valve is rotatable by 90° between full open and closed positions.

9. A coupler as set forth in claim 8, wherein said inlet port is disposed at an axial end of said ball valve, and said vent and outlet ports are opposite one another along a diameter perpendicular to said rotation axis.

10. A coupler as set forth in claim 9, wherein said outlet port and vent port are surrounded by respective annular seals that engage opposite sides of said valve ball to seal said outlet port and vent port from a valve region intermediate said annular seals.

11. A coupler as set forth in claim 1, wherein said housing includes a connecting passage connecting said outlet port with said socket; and comprising valve means mounted for axial movement within said coupler body portion between open and closed positions respectively opening and closing said connecting passage, and bias means for urging said valve means from its open position to its closed position in a direction opposite the direction of insertion of the nipple into said socket; and said valve means having an end thereof positioned to be engaged by the nipple when inserted into said socket for moving said valve means from its closed to its open position.

12. A coupler as set forth in claim 11, wherein said valve means includes a tubular stem forming an interior flow passage extending to said end of said valve means, and said end of said valve means is stepped to form an annular shoulder for engaging a front face of the nipple and an axially extending tubular portion surrounding said interior flow passage and projecting from said annular shoulder for telescopic insertion into an annular interface seal in a socket in the nipple.

13. A coupler as set forth in claim 1, in combination with the nipple, said nipple having meanings cooperable with said nipple retainer means for holding said nipple in said socket.

14. A valve for a pressurized fluid line comprising a valve body having an inlet port, an outlet port and a vent port; a rotatable valve element mounted in said valve body between said inlet port, outlet port and vent port, said valve element having a closed position for blocking flow of fluid from said inlet port to said outlet port and an open position for permitting flow of fluid through a flow passage therein from said inlet port to said outlet port, and said valve element further including a vent passage operable to effect fluid communication between said outlet port and said vent port when said valve element is in said closed position and not when in said open position; and annular valve seals in said valve body, said valve seals engaging opposite sides of said valve element and being spaced apart by said valve element to define therebetween a region in said valve body communicating with one of said inlet, outlet and vent ports, and said annular valve seals respectively surrounding the other two of said inlet, outlet and vent ports.

15. A valve as set forth in claim 14, wherein said valve element is a ball valve having a rotation axis, and said ball valve is rotatable by 90° between full open and closed positions.

16. A valve as set forth in claim 15, wherein said vent passage has opposite ends disposed at diametrically opposite sides of said ball valve.

17. A valve as set forth in claim 15, wherein said flow passage has one end disposed at an axial end of said ball valve and another end disposed at a side of said ball valve.

18. A valve as set forth in claim 15, wherein said inlet port is disposed at an axial end of said ball valve, and said vent and outlet ports are opposite one another along a diameter perpendicular to said rotation axis.

19. A valve as set forth in claim 14, including connector means for connecting said inlet port to an external device.

20. A valve as set forth in claim 14, wherein said valve element has a center and a rotational axis intersecting said center, and said inlet, outlet and vent ports are disposed along respective orthogonal axes intersecting said center of said valve element.

21. A push-to-connect coupler comprising a coupler body including a socket for axially receiving a mating nipple, nipple retainer means radially movable in said coupler body for retaining a nipple in said socket, a locking sleeve mounted on said coupler body for axial movement between a lock position radially inwardly displacing said nipple retainer means to lock with the nipple and a release position permitting radial outward movement of said nipple retainer means to release the nipple, locking sleeve retainer means radially movable in said coupler body for retaining said locking sleeve in its release position, and a cocking member mounted within said coupler body for axial movement, said cocking member being positioned to be engaged by the nipple when inserted into said socket and movable thereby through an initial range of movement radially outwardly displacing said locking sleeve retainer means to engage and hold said locking sleeve in said release position to an uncocking position permitting radially inward movement of said locking sleeve retainer means to release said locking sleeve for movement to its lock position thereby to lock the nipple in said coupler.

22. A coupler as set forth in claim 21, comprising bias means for urging said locking sleeve from its release position to its lock position.

23. A coupler as set forth in claim 21, wherein said retainer means includes a plurality of radially movable detents, and said cocking member includes retaining surface means for holding said detents radially outwardly displaced through said initial range of movement of said cocking member and relief means at one end of said retaining surface means for permitting radial inward displacement of said detents to release said locking sleeve for movement from its release position to its lock position.

24. A coupler as set forth in claim 21, wherein said coupler body includes a connecting passage connecting an inlet port with said socket; and comprising valve means mounted for axial movement within said coupler body between open and closed positions respectively opening and closing said connecting passage, and bias means for urging said valve means from its open position to its closed position in a direction opposite the direction of insertion of the nipple into said socket; and said valve means having an end thereof positioned to be engaged by the nipple when inserted into said socket for moving said valve means from its closed to its open position.

25. A coupler as set forth in claim 24, wherein said valve means includes a tubular stem forming an interior flow passage extending to said end of said valve means, and said end of said valve means is stepped to form an annular shoulder for engaging a front face of the nipple and an axially extending tubular portion surrounding said interior flow passage and projecting from said annular shoulder for telescopic insertion into an annular interface seal in a socket in the nipple.

26. A coupler as set forth in claim 24, wherein said cocking member includes a cocking ring mounted for telescoping movement within said socket, and said valve means includes a tubular stem mounted for telescoping movement within said cocking ring, and said stem has a shoulder for engaging a shoulder on said cocking ring to provide a stop for said cocking ring.

27. A coupler as set forth in claim 21, wherein said cocking member includes a cocking ring mounted for telescoping movement within said socket.

28. A coupler as set forth in claim 21, in combination with the nipple, said nipple having meanings cooperable with said nipple retainer means for holding said nipple in said socket.

* * * * *